Aug. 20, 1946.  G. W. PONTIUS, 3D., ET AL  2,406,102
TRIGGER SYSTEM FOR GUN TURRETS
Filed April 20, 1942   6 Sheets-Sheet 1

INVENTORS
GEORGE W. PONTIUS III
ARTHUR P. WILSON
FRANK V. KUZMITZ
BY
*M. W. McConkey*
ATTORNEY

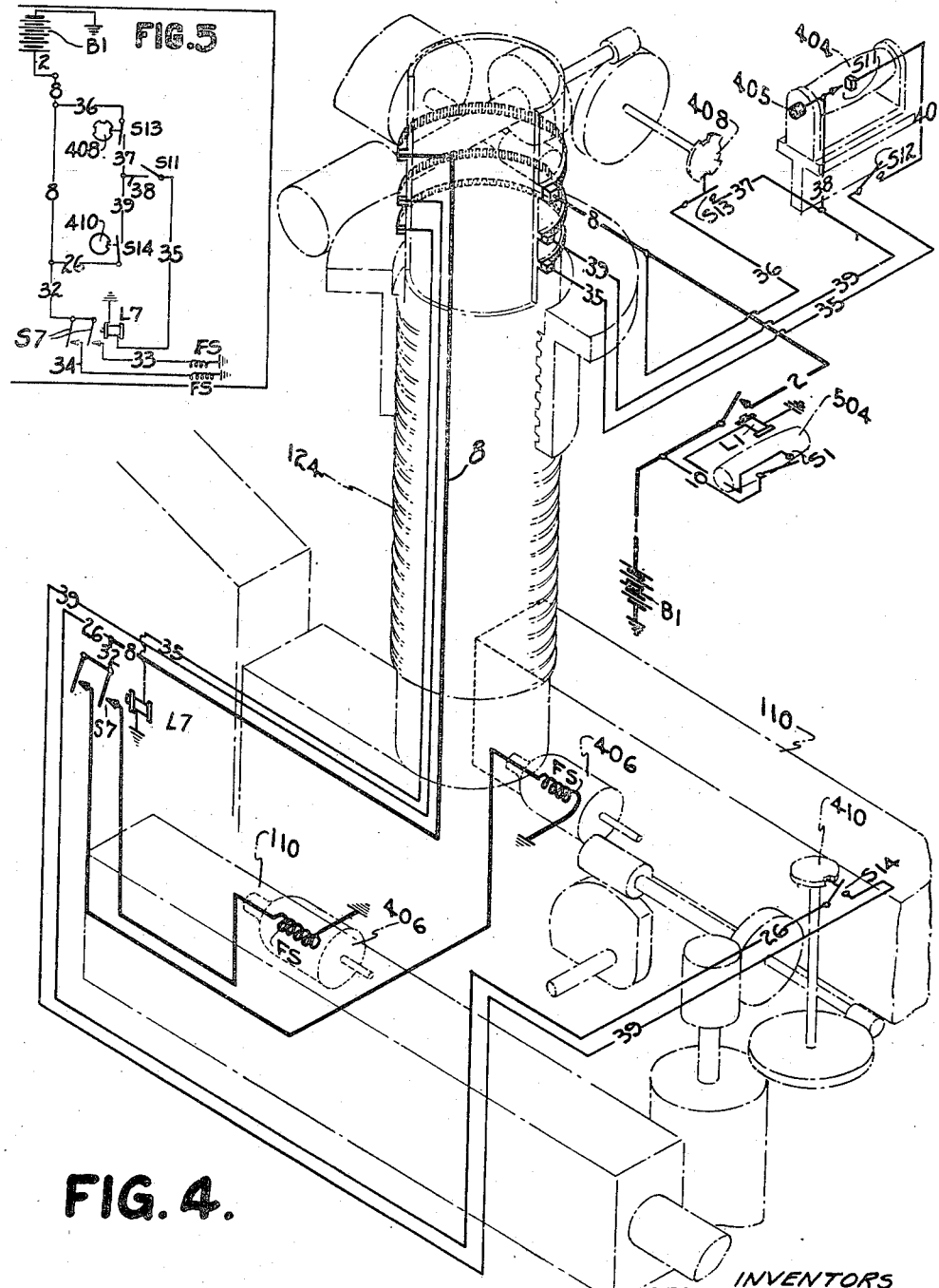

Aug. 20, 1946.   G. W. PONTIUS, 3D., ET AL   2,406,102
TRIGGER SYSTEM FOR GUN TURRETS
Filed April 20, 1942   6 Sheets-Sheet 4

INVENTORS
GEORGE W. PONTIUS III
ARTHUR P. WILSON
FRANK V. KUZMITZ
BY
M. W. McConkey
ATTORNEY

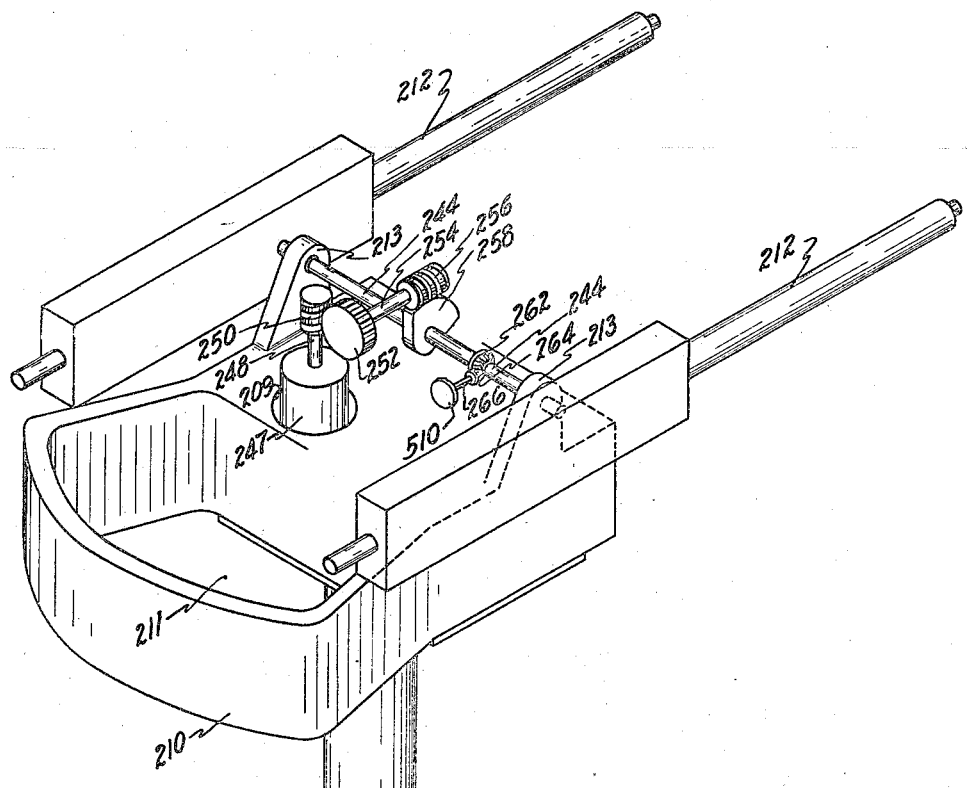
FIG. 8.
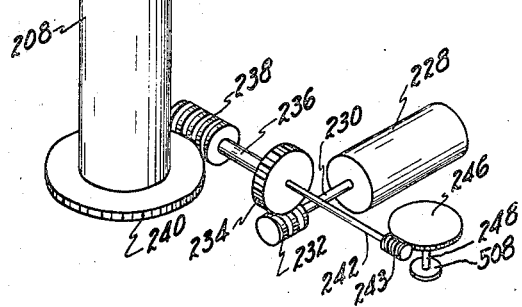

Aug. 20, 1946.  G. W. PONTIUS, 3D., ET AL  2,406,102
TRIGGER SYSTEM FOR GUN TURRETS
Filed April 20, 1942  6 Sheets-Sheet 6

INVENTORS
GEORGE W. PONTIUS III
ARTHUR P. WILSON
FRANK V. KUZMITZ
BY
M. W. McConkey
ATTORNEY Patented Aug. 20, 1946

2,406,102

UNITED STATES PATENT OFFICE 2,406,102

TRIGGER SYSTEM FOR GUN TURRETS

George W. Pontius, III, Arthur P. Wilson, and Frank V. Kuzmitz, South Bend, Ind., assignors to Bendix Aviation Corporation, South Bend, Ind., a corporation of Delaware Application April 20, 1942, Serial No. 439,622

2 Claims. (Cl. 89—27)

This invention relates to gun turrets and more particularly to an electrical system for firing the guns of a turret mounted on an airplane.

The firing of airplane guns must be rapidly performed since the sights are on the targets for fractions of a second only. This necessitates power control of the trigger mechanism, since the slightest amount of resistance to manual effort will slow up the firing. A simple push button electrical switch is therefore used, and to decrease the size of this switch, it is connected to operate a relay which in turn applies the electrical current to the power devices for firing the guns.

In turrets mounted in airplanes, means must be provided to keep the guns from shooting at parts of the airplane and thus injuring it. This cut-out means must be automatic and must not interfere with the movement of the turret.

The invention will be described as applied to turrets for the bottom and upper surfaces of airplanes respectively. The lower turret is shown in more detail in application Serial No. 391,911, filed May 5, 1941, on behalf of Pontius.

It is an object of the invention to provide power means for firing the guns of a turret.

It is a further object to provide automatic cut-out means for the firing control of a gun.

Other objects and advantages of the invention will be apparent in the following description and claims.

In the drawings forming a part of this specification,

Figure 4 is a phantom view of the lower turret which is shown in broken lines with the electric trigger circuit superimposed thereon;

Figure 5 is a wiring diagram of the trigger circuit of Figure 4;

Figure 8 is a schematic isometric projection of the mechanical parts and movements of the upper turret.

Figure 1:
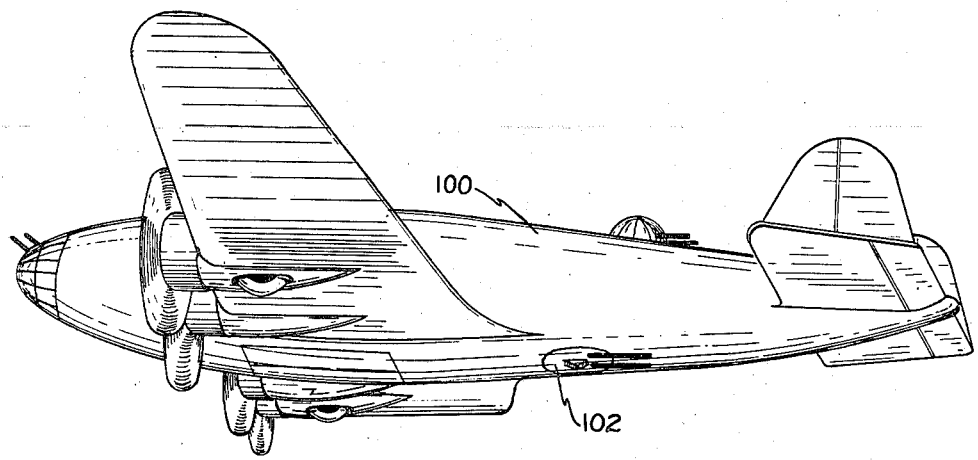
Figure 1 is substantially a side view of an airplane having a lower turret with a trigger system made in accordance with the invention.

The placement of the lower turret in an airplane is shown in Figure 1. Airplane 100 retains a turret 102 in a retracted position in the bottom of the fuselage. When thus retracted the bottom of the turret is substantially flush with the surface of the fuselage, giving no substantial interference to the slipstream.

Figure 2:
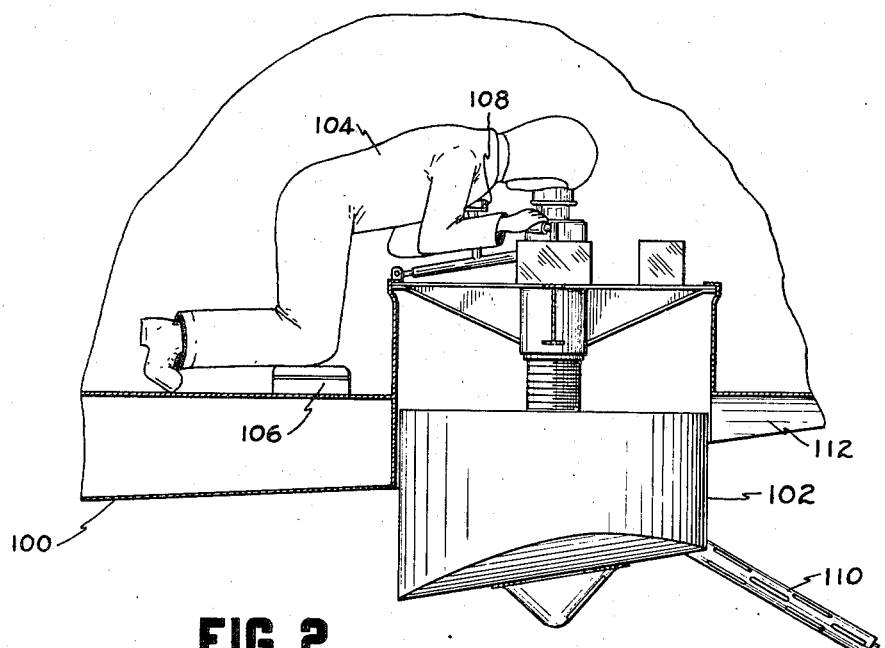
Figure 2 is an enlarged sectional view of the airplane of Figure 1 in the region of the turrets, showing the turret in an operative position and being at the instant controlled and fired by a gunner.

The turret 102 is shown on an enlarged scale in an extended position in Figure 2. A gunner 104 kneels on a cushion 106, his chest supported on a rest 108 attached to the turret. The gunner looks through a periscope in the turret to sight the guns 110, and with his right hand operates the electrical power controls for the movements of the turret and the gun, while with his left hand he operates a trigger control. Guns wells 112 are provided in the airplane 100 at the rear of the turret as a housing for the guns when the turret is retracted, at which times the guns 110 will be horizontal.

Figure 3:
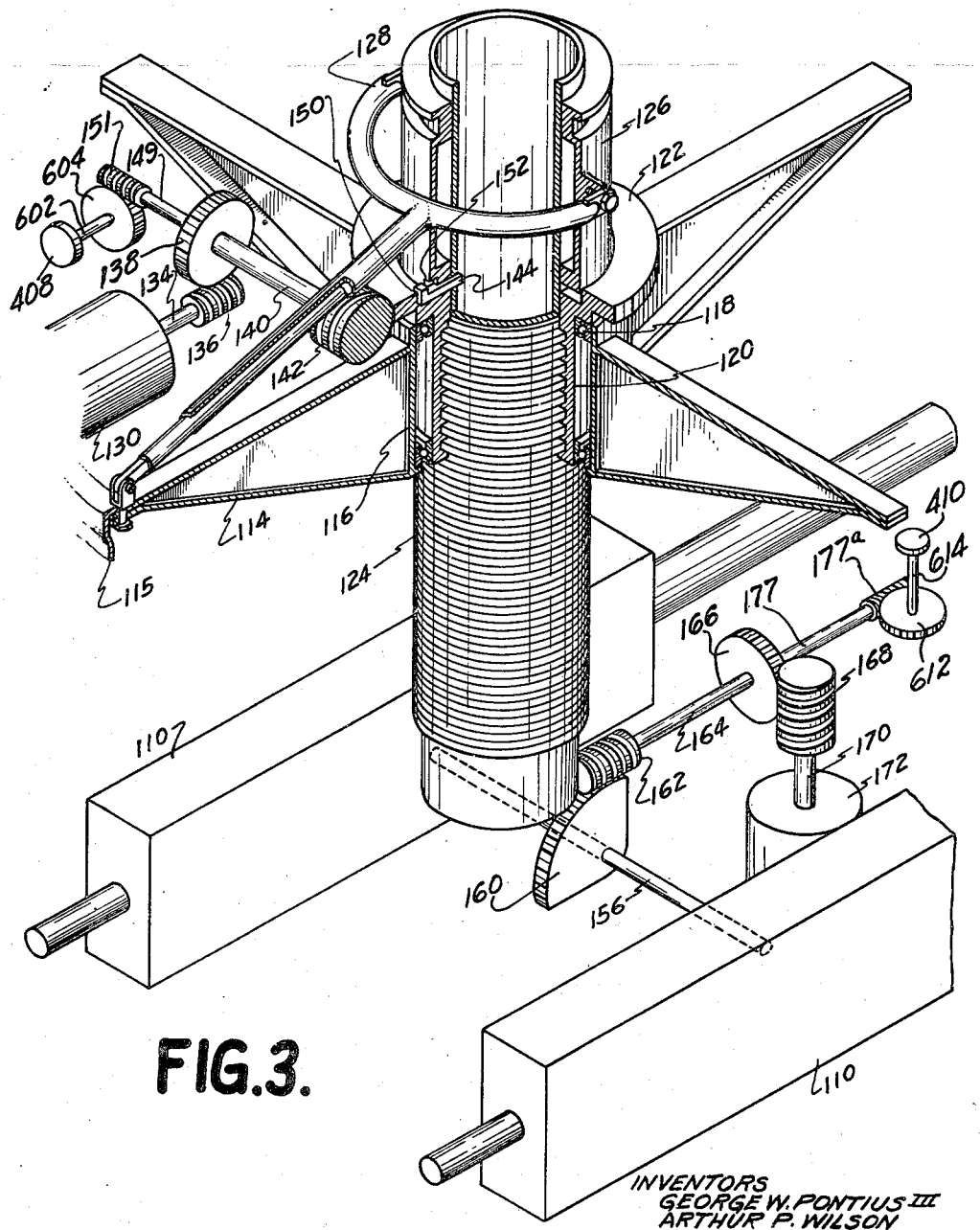
Figure 3 is an isometric partly schematic view of the turret in an extended position, parts thereof being in isometric section to show the mechanical parts and movements.

The mechanical parts relating to the movement of the turret are shown in diagrammatic form in Figure 3 wherein the turret is shown in an extended position. The turret 102 is supported on a four-armed spider 114 which is secured to structural members such as 115 of the airplane 100, and which has a central collar 116. Ball bearings such as 118 rotatably support an internally threaded sleeve 120 within collar 116, which sleeve has an upper ring gear portion 122. A threaded column 124 is threaded into sleeve 120 and is thereby supported within spider 114. A head unit 126 rotatably rides on the upper end of column 124 and is itself restrained from rotation by a telescoping yoke member 128 secured to the outer end of one arm of spider 114.

A single power source is used to rotate the sleeve 120 in order to rotate the turret in azimuth or optionally to retract and extend the turret. This power source is an electric motor 130 suitably secured to the spider 114. The motor 130 drives a motor shaft 134 to which is secured a worm 136. Worm 136 engages a worm wheel 138 which is secured to a drive shaft 140 having suitable bearings which will be later described. A worm 142 on shaft 140 engages ring gear 122, causing the sleeve 120 to rotate within spider collar 116. Through the gear train thus described, electric motor 130 is made to rotate sleeve 120. The motor 130 can be reversed by reversing its field current, thus reversing the direction of rotation of sleeve 120. The gear train provides a large reduction in rotation allowing the use of a very high speed motor, to provide a high power to weight ratio.

Also shown in Figure 3 is a shaft 149 driven by motor worm wheel 138 and having a worm 151 on the outer end thereof. Worm 151 drives a worm wheel 604 which in turn drives a compensator shaft 602 having a rotary trigger cam 408 secured thereto. The gear reduction at worm 151 is similar to that of driving worm 142 at the column resulting in compensator shaft 602 making a complete rotation for every rotation of column 124. In other words, the azimuth trigger cam 408 is synchronized with the azimuth movement of the turret.

The column 124, and thereby the turret also, may be rotated in azimuth or retracted and/or extended, by selectively connecting column 124 with sleeve 120 or with non-rotatable head 126. This selective connection is performed by an L-shaped key 144 held in a hole through column 124 and selectively engaging an internal notch 150 in sleeve 120, or an external notch 152 in non-rotatable head 126. The mechanism for moving key 144 has been described in Pontius application Serial No. 391,911, and has been described fully and claimed in Pontius et al. application Serial No. 407,468, filed August 19, 1941, now Patent No. 2,389,997, dated November 27, 1945.

When key 144 engages notch 152 in non-rotatable head 126, column 124 is restrained from rotation. If motor 130 now rotates ring gear 122, and thereby sleeve 120, the column 124 will be raised or lowered according to the direction of rotation of sleeve 122. The head 126 is lowered or raised with column 124, and the yoke member 128 will telescope and extend and will act at all times to keep head 126 from rotating. In this way the extension and retraction of turret 102 is accomplished. When the turret 102 is extended the key 144 may be moved to engage notch 150 in sleeve 120 and the column 124 will rotate as sleeve 120 rotates, and thus provide the operative movement of rotation in azimuth. It will be noted that in such case the key 144 will be out of notch 152 and there is no restriction on the movement in azimuth. The column 124 can be rotated continuously in either direction for any given number of rotations.

Certain parts of the turret are fastened on the lower end of column 124. These parts include a rotatable shaft 156 to which the guns 110 are secured. A worm wheel sector 160 is secured to shaft 156 and is engaged by a worm 162 fastened to a drive shaft 164. Drive shaft 164 in turn is driven by a worm wheel 166 secured thereto, which is driven by a worm 168 secured to a motor shaft 170 of an electric elevation motor 172.

Also shown in Figure 3 is a gearing system for an elevation trigger cam. Connected to motor worm wheel 166 is a shaft 177 having a worm 177a secured to one end thereof. Worm 177a drives a compensator worm wheel 612 which in turn drives an elevation compensator shaft 614. Fastened to the end of shaft 614 is an elevation trigger cam 410. The gear reduction at worm 177a is not the same as at worm wheel sector 160 and shaft 612 rotates approximately three times faster than gun shaft 156. This is permissible since the greatest movement of the guns in elevation (or zenith) is about 95°, and the increased movement of shaft 612 gives greater sensitivity.

The elevating gear train and its actuating motor are adapted to elevate or depress the guns, depending upon the direction of rotation of motor 172, which is reversed by reversing its field. The guns 110 can be elevated above horizontal as far as is permitted by the shape of the airplane in which the turret is mounted, and can be depressed to point straight down. The elevation (or zenith) arc as will be described for purposes of illustration, will be limited to a 90° arc from horizontal to straight down.

The trigger circuit for the turret is shown in Figure 4 as applied to the turret and is shown in diagrammatic form in inset Figure 5. Provision must be made for a cut-out mechanism to prevent the guns from shooting at various parts of the airplane. When the guns are horizontal and pointing forward they might shoot into the revolving propellers and they might shoot into the fuselage directly in front of the turret. Also, when the turret is designed to shoot above horizontal at the rear, the guns might shoot at the tail wheel. Thus the circuits and mechanism which will now be described provide cut-out means for the trigger fire at these danger points.

As explained above, the trigger cut-out is necessary only when the guns are elevated to a substantially horizontal position, and then only for certain forward positions. The azimuth trigger cam 408 has been previously referred to in connection with Figure 3 and is shown in Figure 4 near the upper part of the figure. As shown in Figure 4 the cam 408 is notched for those forward positions in which the gun should not shoot. The elevation trigger cam 410 has been previously referred to in connection with Figure 3 and is shown in Figure 4 near the lower right corner of that figure. As shown in Figure 4 the elevation cam 410 is notched for the horizontal position at which the guns should not shoot. As explained with reference to Figure 3 the azimuth cam 408 and the elevation cam 410 are geared to move in synchronism with the azimuth and elevation movements of the turret respectively.

Referring to Figure 5, current from battery B1 flows through wires 2, 8 and 32 to an armature S7 of a relay L7, which when energized passes current through wires 33 and 34 to two identical firing solenoids FS one for each gun 110. The relay L7 is energized by current flowing through a wire 35 which current is regulated by three switches, a firing switch S11, an azimuth switch S13 and an elevation switch S14. Branching from a wire 8 is a wire 36 which leads to azimuth switch S13, which is normally closed by cam 408 and is opened only when one of the notches in the cam 408 come opposite the switch. The other end of switch S13 is connected to a wire 37 which leads to a wire 38 which leads to firing switch S11 referred to above.

Branch wire 26 leads from wire 8 to elevation switch S14 which is normally closed by elevation cam 410, and is opened only when the notch in the cam is opposite the switch. A wire 39 is connected to the other side of elevation switch S14 and leads to wire 38 also. Wire 38 is connected as stated above to firing switch S11 the other side of which is connected to relay wire 35.

From the above description of Figure 5, it is apparent that the guns can be fired through firing solenoids FS at nearly all times. If the guns are elevated to a horizontal position the switch S14 will be broken but current might nevertheless flow through switch S13 to trigger switch S11. When azimuth switch S13 is open current might likewise flow through elevation switch S14. It is only when both switch S13 and switch S14 are open that the guns cannot be fired. The switches S13 and S14 will both be opened only when the guns are pointed at some part of the ship corresponding to the combination of notches on azimuth cam 508 and elevation cam 410.

This trigger circuit will now be applied to Figure 4, and the corresponding circuit can be traced also on Figure 5. Current is derived from battery B1 and flows through wire 1, through relay L1 (which is energized by closing a shunt circuit through a wire 10, a switch S1 in a control handle 504, and the winding of the relay L1), and through wire 2 to wire 8. The branch 32 from wire 8 leads to the firing relay L7 and supplies current for firing the guns when relay L7 is energized. Another branch from wire 8, wire 26, leads to the elevation compensator box which retains cam 410, and is connected to switch S14. The wire 39 leads from the other side of switch S14 back up the central column to join wire 37 at its junction with wire 38.

The other branch of the parallel circuit to wire 38 is shown at the top of Figure 4. Wire 36 branches from wire 8 to lead to switch S13 which is connected by wire 37 to wire 38. Firing switch S11 is placed in a trigger grip 404 and is actuated by trigger button 405 which the gunner presses with his left thumb. A wire 40 leads from firing switch S11 to a safety switch S12, the other end of which is connected to the relay wire 35 leading to relay L7. The switch S14 and wires 8, 26 and 39 of the elevation cam circuit form a parallel circuit with respect to the switch S13 and wires 8, 36, and 37 of the azimuth cam circuit. The parallel circuit formed by the azimuth and elevation circuits is in series with the firing switch S11 and the relay L7.

The operation of the trigger circuit for the lower turret as shown in Figure 4, and traceable on Figure 5, is as follows. Safety switch S12 is usually open, at which times the guns cannot be fired. After the turret is extended and ready for combat, the gunner will manually close safety switch S12. The gunner will now be gripping the control handle 504 with his right hand, closing switch S1 to energize relay L1 and pass current to the electrical system of the turret shown in Figure 4. When the gunner desires to fire the guns, he places his left hand on the trigger grip 404 and presses button 405 closing switch S11. Current will usually flow from either wire 37 or 39 through wire 38 and switch S11 through wire 40 and safety switch S12 and through wire 35, down the central column to relay L7. When relay L7 is energized current flows to the firing solenoids FS in housings 406 and these in turn cause the guns 110 to fire.

If the guns are pointing forward at an angle in line with the lower parts of the airplane, the azimuth cam 408 will rotate in synchronism and one of its notches will allow switch S13 to open. Current can nevertheless flow to firing switch S11 from wire 39 and the guns can still be fired. If the guns should now be elevated to a position in line with the lower parts of the airplane, the elevation cam 410 would rotate in synchronism and its notch would allow switch S14 to open.

With both switch S13 and switch S14 open no current will flow to firing switch S11 and the guns cannot be fired. Thus through the means of the two dimensions of elevation and azimuth, danger areas can be definitely plotted, and through the use of cams synchronized with movement in azimuth and elevation, cut-out means for the trigger circuit can be provided for these danger areas.

Figure 6:
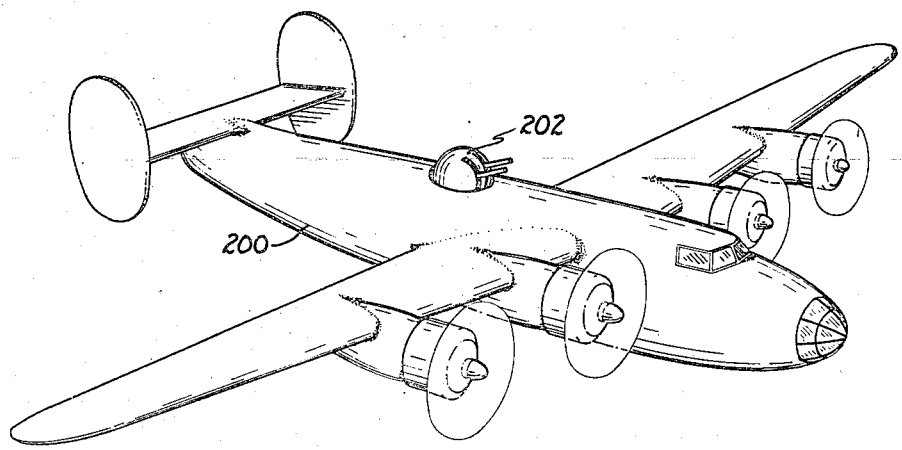
Figure 6 is a perspective view of an airplane having an upper turret with a trigger system made in accordance with the invention.

The mounting of the upper turret is illustrated in Figure 6. An airplane 200 has mounted on the rear part of the fuselage a turret 202. The turret is adapted to rotate 360° for a given number of rotations.

Figure 7:
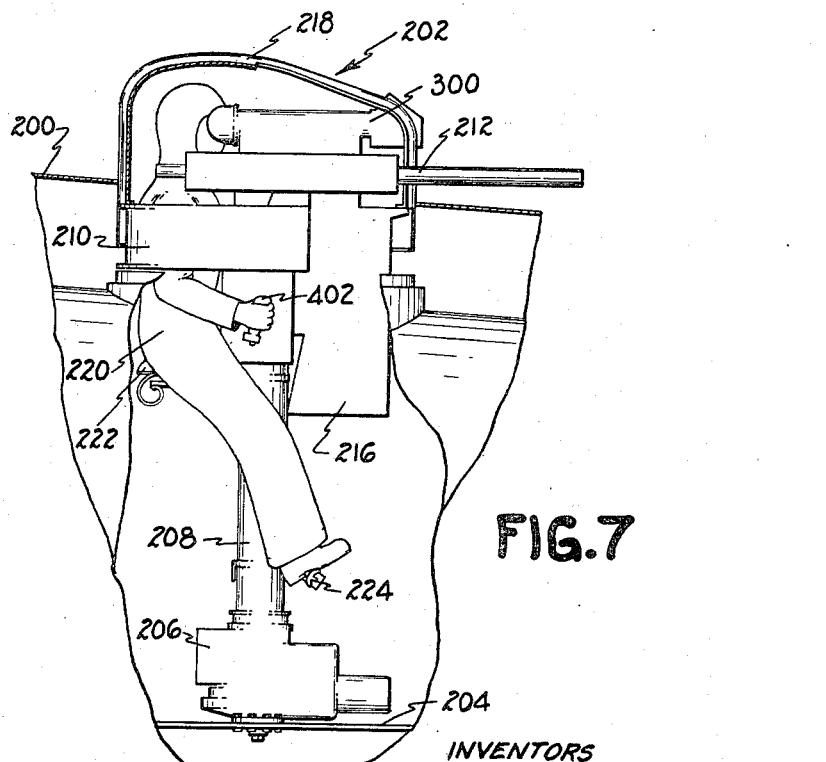
Figure 7 is a vertical section through the airplane and the canopy of the turret shown in Figure 6 showing a gunner operating the upper turret with the guns pointed toward the rear of the airplane.

The mounting of the upper turret is shown in detail in Figure 7. Secured to longitudinal members 204 of the airplane 200, is a base member 206 which rotatably supports a column 208. Secured to the top of rotatable column 208 is a frame member 210 to which the guns 212 are mounted for rotation in elevation. Also secured to frame 210 is a periscope 300 and an ammunition can 216. A transparent canopy 218 covers the top of the turret and is secured to frame 210.

The turret is operated by a gunner 220 sitting on a seat 222 secured to the column 208 and placing his feet on a rest 224 also secured to the column 208. With his right hand the gunner 220 grips a control handle 402 which he manipulates to rotate the turret in azimuth in either direction or elevate or depress the guns. The gunner sights the guns by looking through periscope 300, moving the turret and guns in alignment with the target. All the mechanism mounted on the column 208 rotates in azimuth, and the guns 212 and the movable part of the periscope rotate in elevation as well as azimuth.

The mechanical parts and movements of the turret are shown schematically in Figure 8. At the bottom of the figure a high speed electrical motor 228 drives a motor shaft 230 to which is secured a worm 232. Worm 232 drives a worm wheel 234 secured to a drive shaft 236 to which is secured at the other end a driving worm 238. Drive worm 238 engages a worm wheel 240 secured to rotatable column 208, and drives column 208 in rotation in either direction depending upon the direction of rotation of azimuth motor 228.

Also secured to worm wheel 234, is a compensator drive shaft 242 to which is secured a compensator worm 243. Worm 243 drives compensator worm wheel 246 to which is connected compensator shaft 248. Mounted on compensator shaft 248 is a trigger cam 508.

The gear reduction between compensator worm wheel 246 and worm 243 is the same as that between column worm wheel 240 and driving worm 238, resulting in compensator shaft 248 rotating one revolution for every revolution of column 208 and rotating in synchronism.

Rotatable column 208 is preferably made of aluminum or magnesium to reduce weight. The frame 210 secured to the top of column is also preferably magnesium or aluminum and may be made by casting. An opening 211 in the frame 210 provides a place in which the gunner may place his body for operating the turret. The guns 212 are secured to a rotatable gun shaft 244 supported near each gun by frame brackets 213.

Gun shaft 244 is driven in elevation by a high speed electrical motor 247 positioned within a well 209 in frame 210. Motor 247 drives a motor shaft 248 to which is secured worm 250 engaging driving worm wheel 252 mounted on a drive shaft 254. Secured on the other end of drive shaft 254 is a driving worm 256 engaging a worm wheel sector 258 secured to gun shaft 244. The gun shaft is rotated in either direction by reversing elevation motor 247, elevating or depressing the guns according to direction of rotation of motor 247.

The elevation compensator drive is also shown in Figure 8 and is obtained through a bevel gear 262 secured to shaft 244, and driving a matching bevel gear 264 which drives elevation compensator shaft 266. Fastened to compensator shaft 166 is an elevation trigger cam 510. Since the elevation movement of the guns is about 90°, the rotation of compensator shaft 266 is multiplied about three times to increase sensitivity of the cam control.

Figure 9:
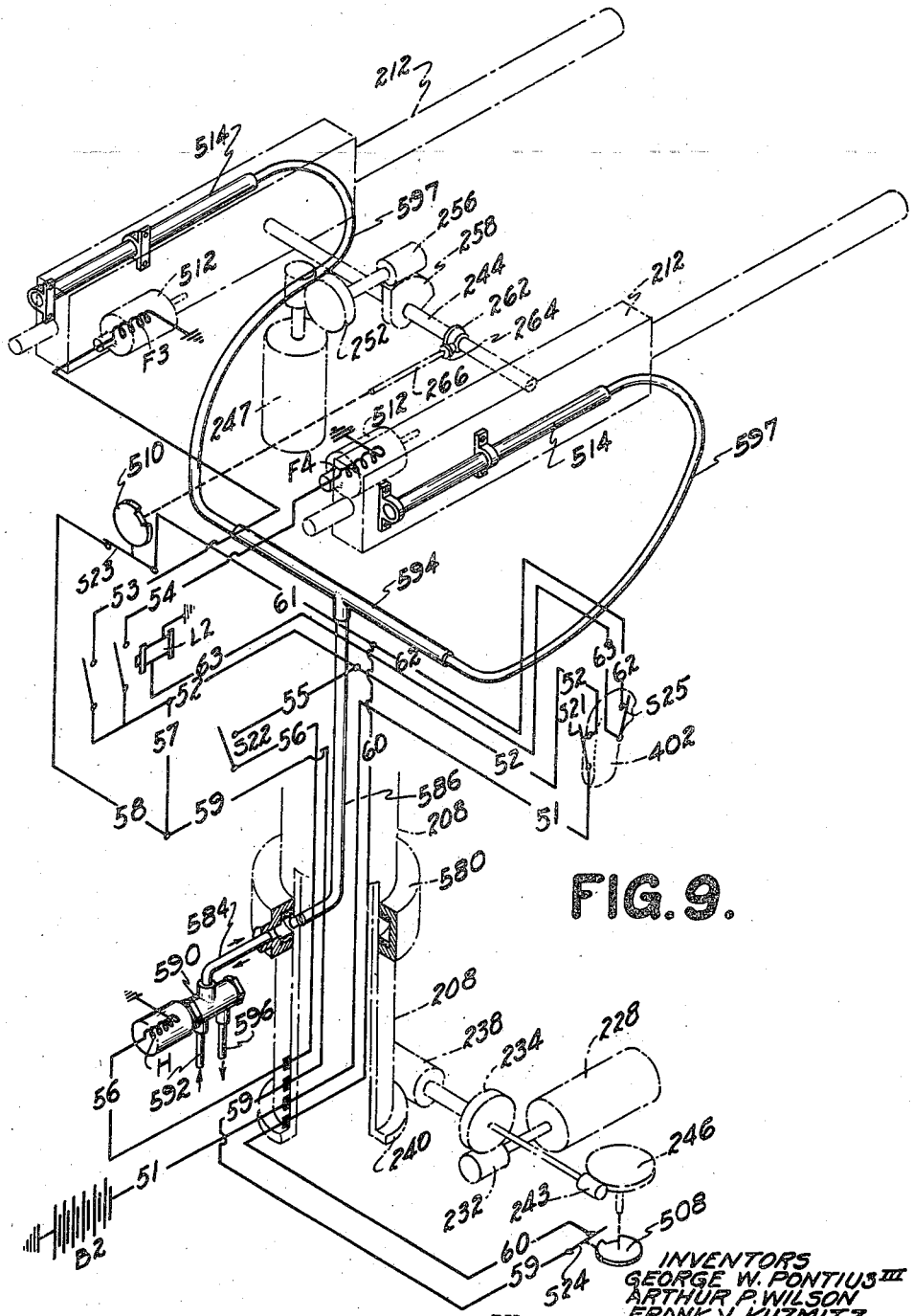
Figure 9 is a phantom view of the upper turret which is shown in broken lines with the electric trigger circuit superimposed thereon.

The trigger circuit and charging circuit for the guns of the upper turret are shown in Figure 9 and it will be noted that the circuit is similar to that of the lower turret. Parts of the turret already identified are shown in broken outline including the center post 208, the ring gear 240, the driving worm 238 and the azimuth motor 228. Also shown is the azimuth compensator drive including worm wheel 246 and the driven azimuth trigger cam 508. On the upper end of the turret the guns 212 are mounted on shaft 244 and driven in elevation by elevation motor 247. Also shown in dotted outline is the elevation compensator drive including shaft 266 on which is mounted elevation trigger cam 510.

The electrical trigger circuit and electrical and hydraulic charging circuit is superimposed in solid lines on the dotted outline of the turret. A battery B2 supplies current to a wire 51 leading through the brush box, up the column, and to the control handle 402 where it connects to a switch S21. Switch S21 is the main power switch for passing all current to the turret and when the gunner grips control handle 402 he closes switch S21 by the act of grasping the control handle. Because of this type of grip control the power will automatically be cut off if the gunner is shot thus preventing injury to the turret or the airplane in which it is mounted.

Referring to Figure 9 when switch S21 is closed current flows to a wire 52 which is connected to both fingers of a double relay L2. Energizing relay L2 causes current to flow through wires 54 and 53 to firing solenoids F3 and F4 in housings 512 secured to the guns, causing the guns 212 to fire.

Branching from wire 52 near the center post is a wire 55 leading to a switch S22 the other end of which is connected to a wire 56 leading down the column 208 and out the brush box to a solenoid H of an hydraulic valve 590. Switch S22 is manually operated by the gunner whenever either gun 212 jams. Closing switch S22 passes current to valve 590 causing it to open to pass hydraulic fluid from an inlet pipe 592 to a gland conduit 584 through an hydraulic gland 580 to a conduit 586. A fitting 594 is connected to a conduit 586 which passes fluid thereto, at which point flexible tubing 597 is connected leading to chargers 514. After the charging is completed switch S22 is opened deenergizing valve 590 and allowing it to return to normal at which time the hydraulic fluid in the charger will flow through the valve to exhaust conduit 596.

Still referring to Figure 9, in certain positions of the turret, the guns 212 will be pointing at a part of the airplane and if firing were possible, injury to the airplane would result. For this purpose a cut-out mechanism for the trigger system is provided, which will now be described.

Also branching from wire 52 is a wire 57 leading to two wires 58 and 59. Wire 58 leads to a switch S23 actuated by elevation cam 510. Cam 510 is notched in a portion corresponding to the elevation position of the guns at which they would fire upon the airplane. When the guns move in elevation to this position the notch opens switch S23 and no current can pass at that point to supply a trigger switch.

The other branch wire 59 connected to wire 57 leads down the column and through the brush box to a switch S24 actuated by azimuth trigger cam 508. Cam 508 is notched in a portion or portions corresponding to the azimuth position of the turret at which the guns would fire upon the airplane. When cam 508 rotates so that the notched portion is opposite the switch S24, no current will flow to the trigger switch at that point.

Connected to switch S24 is a wire 60 leading through the brush box up the central column to join a wire 61 leading from switch S23. Wires 60 and 61 are connected to a wire 62 leading to a trigger switch S25 in the control handle 402. When the gunner desires to fire he closes trigger switch S25 with his finger, passing current to a wire 63 leading to relay L2. If current passes through wire 63 the relay will be energized closing the circuit to the firing solenoids F3 and F4 causing the guns to fire.

In operating the charger circuit of Figure 9, the gunner will be seated in the turret gripping control handle 402 as shown in Figure 7. Gripping control handle 402 closes power switch S21 permitting current to flow from battery B2 up wire 51 to the switch S21 and through wire 52. Branch wire 55 is now hot, and if the guns should now jam, or if for other reasons the gunner should desire to charge the guns, he merely closes charger switch S22 with his left hand while gripping handle 402 in his right hand. Current then passes through wire 56 down column 208 to the solenoid valve 590. Valve 590 opens to permit hydraulic fluid under pressure to enter conduit 584, pass through gland 580, up column conduit 586 and out of fitting 594 to the hydraulic chargers 514. The chargers then retract the bolt of guns 212 charging them.

After the charging is completed the gunner releases switch S22 which opens, deenergizing the solenoid H of valve 590. The valve then returns to normal connecting tube 584 with the exhaust line 596. A quantity of liquid will then flow out of the chargers and connected conduits sufficient to allow the chargers to return to their starting position.

In operating the upper turret trigger system shown in Figure 9 the gunner grasps control handle 402 and in doing so closes power switch S21. This permits flow of current through wire 52 to wire 57 from there to the wires 58 and 59 forming part of a parallel circuit to firing switch S25. Current in wire 58 may be interrupted by a switch S23 actuated by cam 510 synchronized with the elevation movement of the guns 212. The other branch of the parallel circuit, wire 59 leads down the column and current flow is interrupted by switch S24 actuated by cam 508 synchronized with the azimuth movements of the turret. When either cam 510 or 508 rotates to a point corresponding to the point at which bullets would hit the airplane, the respective circuit is broken. When the azimuth and elevation positions both correspond to a position where the bullets will strike part of the airplane, no current will flow through either branch of the parallel circuit and closing the trigger switch S25 will have no effect.

When the position of the turret and guns is other than the cut-out position, current will flow through one or both branches of the parallel circuit wires 58, 61, 59 and 60 respectively to wire 62 passing current to firing switch S25. When the gunner desires to fire he merely presses switch S25 with his finger, passing current through wire 63 to relay L2 and actuating it. Current then flows from wire 52 to wires 53 and 54 to the firing solenoids F3 and F4 causing the guns to fire. Release of switch S25 breaks the circuit to relay L2, the power circuit to the firing solenoid is broken and the guns cease to fire. A relay control of firing is used to reduce the size of the manual switch to a minimum and increasing ease of operation.

Although this invention has been described with reference to particular embodiments thereof, it is not limited to these embodiments or otherwise except by the terms of the following claims.

What is claimed is:

1. In combination, a turret movable in azimuth, guns mounted on said turret for movement therewith in azimuth and relative thereto in elevation, an electrical system comprising a source of current, a firing circuit including a firing device for each gun, a first circuit normally open and including a manually operated switch for closing the aforesaid first circuit, means controlling the firing circuit and including a relay coil in the first circuit, said means being responsive to closing the first circuit to thereby close the firing circuit, a cam constructed and arranged to follow the guns in azimuth, said cam having notches therein corresponding to positions of the guns in azimuth where it is desirable to disconnect said devices, a first means in said first circuit arranged to cooperate with the notched portions of the cam for opening the first circuit, a second cam constructed and arranged to follow the movement of the guns in elevation, said second cam having notches therein corresponding to positions of the guns in elevation where it is desirable to disconnect said devices, a second circuit normally open and including said relay coil and said manually operated switch for closing said circuit, and a second means in the second circuit connected in parallel with said first means, said second means arranged to cooperate with the notched portions of said second cam for opening the second circuit, whereby the firing devices are disconnected from the firing circuit only if said first and second means are cooperating with the notched portions of said first-named cam and said second cam respectively.

2. In combination, a turret movable in azimuth, guns mounted on said turret for movement therewith in azimuth and relative thereto in elevation, an electrical system comprising a source of current, a firing circuit including a firing solenoid for each gun, a series parallel circuit including a manually controlled switch arranged in the series portion of said last-named circuit, a normally open switch in the firing circuit, a relay coil in the series portion of the series parallel circuit and constructed and arranged to close said normally open switch in response to energization of the relay coil when the manually controlled switch is closed, a pair of cams one of which is constructed and arranged to follow the movement of the guns in azimuth and the other of which is constructed and arranged to follow the movement of the guns in elevation, said cam which follows the movement of the guns in azimuth having notches therein corresponding to positions of the guns in azimuth where it is desirable to disconnect said solenoids, said cam which follows the movement of the gun in elevation having notches therein corresponding to positions of the guns in elevation where it is desirable to disconnect said solenoids, and means in the parallel branches of said series parallel circuit which concurrently cooperate with the notched portions of said azimuth and elevation cams at times for causing deenergization of said relay coil to permit the normally open switch to open to disconnect said solenoids, said means being constituted to cause energization of said relay coil when the means of either parallel branch ceases to cooperate with the notched portions of its corresponding cam.

GEORGE W. PONTIUS, III.
ARTHUR P. WILSON.
FRANK V. KUZMITZ.